United States Patent
Schmits et al.

(10) Patent No.: US 12,442,677 B2
(45) Date of Patent: Oct. 14, 2025

(54) SYSTEM CONSISTING OF A FILL LEVEL MEASURING DEVICE FOR MEASURING THE FILL LEVEL OF A MEDIUM IN A CONTAINER AND ATTACHMENT AND AN ATTACHMENT

(71) Applicant: KROHNE Messtechnik GmbH, Duisburg (DE)

(72) Inventors: Christoph Schmits, Dortmund (DE); Christian Schulz, Bochum (DE)

(*) Notice: Subject to any disclaimer, the term of this patent is extended or adjusted under 35 U.S.C. 154(b) by 383 days.

(21) Appl. No.: 17/931,023

(22) Filed: Sep. 9, 2022

(65) Prior Publication Data

US 2023/0085220 A1 Mar. 16, 2023

(30) Foreign Application Priority Data

Sep. 10, 2021 (DE) .................. 102021123532.4

(51) Int. Cl.
*G01F 23/284* (2006.01)
(52) U.S. Cl.
CPC ................... *G01F 23/284* (2013.01)
(58) Field of Classification Search
CPC ....... G01F 23/284; G01S 13/88; H01Q 1/225; H01Q 19/06; H01Q 19/062
See application file for complete search history.

(56) References Cited

U.S. PATENT DOCUMENTS

| | | | |
|---|---|---|---|
| 6,325,391 B1 * | 12/2001 | Smith ................... | G01F 23/284 |
| | | | 277/630 |
| 6,759,977 B1 | 7/2004 | Edvardsson et al. | |
| 9,091,584 B2 | 7/2015 | Vogt et al. | |
| 2004/0119636 A1 | 6/2004 | Edvardsson et al. | |
| 2005/0132797 A1 | 6/2005 | Klees et al. | |
| 2014/0047917 A1 | 2/2014 | Vogt et al. | |
| 2015/0241261 A1 | 8/2015 | Cheng et al. | |
| 2016/0320225 A1 | 11/2016 | Welle et al. | |

(Continued)

FOREIGN PATENT DOCUMENTS

| | | | | |
|---|---|---|---|---|
| CN | 109713452 A | 5/2019 | | |
| DE | 19982569 B3 | 1/2001 | | |
| DE | 10355784 A1 * | 2/2005 | ........... | G01F 23/284 |

(Continued)

*Primary Examiner* — Vladimir Magloire
*Assistant Examiner* — Peter Davon Doze
(74) *Attorney, Agent, or Firm* — Patrick D. Duplessis

(57) ABSTRACT

A system includes a fill level measuring device and at least one attachment. The fill level measuring device measures the fill level of a medium in a container. The fill level measuring device has a control and evaluation unit for generating a measurement signal, and a process connection element. The process connection element has a transmission element on the medium side. The transmission element is at least partially permeable to the measurement signal. The at least one attachment is connected to the process connection element. The at least one attachment has, on the medium side, an attachment lens for coupling the measurement signal into the container. The attachment lens is designed and, during operation, arranged behind the transmission element in the propagation direction of the measurement signal in such a way that the attachment lens changes the opening angle of the measurement signal.

16 Claims, 4 Drawing Sheets

(56) References Cited

U.S. PATENT DOCUMENTS

2017/0141474 A1    5/2017  Hengstler et al.
2019/0353514 A1  11/2019  Kienzle et al.

FOREIGN PATENT DOCUMENTS

| | | | | |
|---|---|---|---|---|
| DE | 202009009102 U1 | 10/2009 | | |
| DE | 102012016120 A1 | 2/2014 | | |
| DE | 102017124996 A1 * | 4/2019 | | |
| EP | 1431724 A1 | 6/2004 | | |
| EP | 2428791 A1 * | 3/2012 | ............ | G01N 15/06 |
| EP | 3691026 B1 * | 5/2021 | ............ | G01F 23/284 |
| RU | 2788928 C1 * | 1/2023 | ............ | G01F 23/284 |
| WO | WO-2008055758 A1 * | 5/2008 | ............ | G01F 23/00 |

* cited by examiner

SYSTEM CONSISTING OF A FILL LEVEL MEASURING DEVICE FOR MEASURING THE FILL LEVEL OF A MEDIUM IN A CONTAINER AND ATTACHMENT AND AN ATTACHMENT

TECHNICAL FIELD

The invention is based on a system comprising a fill level measuring device for measuring the fill level of a medium in a container and at least one attachment, wherein the fill level measuring device has a control and evaluation unit for generating a measurement signal and a process connection element, wherein the process connection element has a transmission element on the medium side, wherein the transmission element is at least partially permeable to the measurement signal.

Furthermore, the invention relates to an attachment for connection to a fill level measuring device for producing a system according to the invention.

When it is said that the process connection element has a transmission element on the medium side, it is meant that the transmission element is arranged on the medium side during operation or in the assembled state.

According to one design, the measurement signal is a radar signal and the fill level measuring device is a free-radiating radar level measuring device. The measurement signal can be emitted continuously or pulsed during operation.

BACKGROUND

In practice, free-radiating fill level measuring devices can be used in different situations.

Depending on the measuring situation, different properties of the measurement signals emitted by the level meters are advantageous. The opening angle of the emitted signal is particularly relevant, as it defines the range of the medium that is taken into account to determine the fill level. Wide measurement signals with large opening angles have the advantage that a large area of the medium is captured for determining the fill level. On the other hand, interfering installations in the container during operation can also easily disturb the measurement signal.

Therefore, depending on the situation, it is also advantageous if the measurement signal has as small of an opening angle as possible. Such a design of the measurement signal is used in practice, for example, in narrow, high containers. In particular, lens antennas that emit a measurement signal in the range of 80 GHz can implement a measurement signal with an opening angle of a few degrees.

SUMMARY

The object of the invention is to provide a system comprising a fill level measuring device and an attachment, so that the fill level measuring device can be used in a particularly flexible manner. Furthermore, it is the object of the invention to provide an attachment for producing a system according to the invention.

According to a first teaching, the aforementioned object is achieved by a system mentioned at the beginning, comprising a level measuring device and at least one attachment, in that the at least one attachment is connected to the process connection element, wherein the at least one attachment has an attachment lens on the medium side for coupling the measurement signal into the container, wherein the attachment lens is designed and arranged, during operation, in the direction of propagation of the measurement signal behind the transmission element in such a way that it changes the opening angle of the measurement signal.

For example, the attachment lens can widen the measurement signal, i.e. increase the opening angle, or focus the measurement signal, i.e. reduce the opening angle.

According to the invention, it was recognized that an attachment in front of the transmission element can influence the directional characteristic or the opening angle of the measurement signal, wherein the directional characteristic implemented by the fill level measuring device can be adapted to an individual measurement situation by using the attachment. In this way, a measuring device or a plurality of fill level measuring devices with the same design can be optimized for different measuring situations.

If the attachment is interchangeable, i.e. detachably connected to the fill level measuring device, a single fill level measuring device can also be combined with different attachments and thus optimized for different measuring situations, for example even after installation in a container.

The system according to the invention can thus be used in a particularly flexible manner overall, since the measuring device can be optimized for different applications without having to make structural changes to the measuring device.

In principle, the transmission element and the attachment lens are matched to each other for shaping the measurement signal. In detail, the combination of these elements should also not create a focal point in the container so that the desired measuring region is fully illuminated.

According to a first design, the transmission element is formed as a lens or as a window. According to one design, if the transmission element is formed as a lens, the measurement signal formed by the lens is optimized for a measurement situation, in particular with respect to the opening angle of the measurement signal. For example, a measurement signal with a frequency of about 80 GHz can have a particularly small opening angle of about 4° with a lens diameter of about 70 mm. Alternatively, a measurement signal with a frequency of approx. 80 GHz at a lens diameter of approx. 40 mm can have an opening angle of approx. 8°, which means that a larger measuring region can be captured. It is also conceivable that the lens shapes the measurement signal in such a way that the opening angle has an average value.

The use of a window that is permeable to the measurement signal is also conceivable here.

According to a further particularly preferred design, the connection between the process connection element and the attachment is designed as a detachable connection, wherein the connection is designed as a non-positive and/or positive connection, wherein the connection is preferably implemented via a thread or via a latching connection or via a flange connection. This design has the advantage that the at least one attachment can be connected to the process connection element in a mechanically fixed and also pressure-resistant manner and, moreover, can also be exchanged.

For example, the process connection element has an external thread and the attachment has a matching internal thread via which the attachment is arranged on the process connection element. According to an alternative design, the process connection element has an internal thread and the attachment has a matching external thread via which the attachment is arranged on the process connection element.

Alternatively, the connection between the process connection element and the attachment is formed as a non-detachable connection, wherein the non-detachable connection is preferably formed as a material connection.

According to a further design, a holder is provided, wherein the attachment can be connected to the container via the holder. In addition to the connection to the process connection element, the attachment can likewise be positioned in the container by a corresponding holder.

According to a further preferred embodiment, the attachment is formed as an adapter. Particularly preferably, the adapter can be connected both to the process connection element of the fill level measuring device and to a process connection, in particular a container connection.

In particular, the adapter is designed in such a way that it can be connected both to the process connection element and to a container connection via a threaded connection in each case. For this, the adapter has two threads, particularly preferably two different threads.

For example, the adapter adapts from a GAS thread to an NPT thread. Alternatively, the adapter adapts from an NPT thread to a GAS thread.

In addition, the adapter can also be designed in such a way that it can be connected to the container connection via a bayonet connection.

The design as an adapter thus has the advantage that a fill level measuring device can be arranged on different containers with different container connections via such an adapter. Overall, the flexible arrangement of the fill level measuring device is further improved by this design.

According to a next preferred design, the at least one attachment has an interior space, wherein the interior space is at least partially hollow. In particular, the area between the transmission element and the attachment lens is formed as a hollow space. During operation, the measurement signal is transmitted from the transmission element to the attachment lens via this hollow space.

According to a next design, at least one dielectric material is present in the interior of the at least one attachment for guiding and/or adapting the measurement signal.

Moreover, according to a further design, a horn structure for guiding the measurement signal may be present in the interior of the attachment.

A further advantageous design of the system is characterized in that the transmission element is formed as a lens, wherein the diameter of this lens is smaller than the diameter of the attachment lens.

According to this design, the opening angle of the measurement signal can be focused in a particularly advantageous way, since it is known that a large opening area is necessary to implement a particularly small opening angle of the measurement signal. This design is thus particularly advantageous if interfering installations protrude into the container. In this way, it can be ensured that the measurement signal is not disturbed by corresponding installations. This design is also advantageous if a process medium is to be monitored in a long narrow container.

A further design is characterized in that the transmission element is designed as a lens, wherein the diameter of this lens is larger than the diameter of the attachment lens.

With this design, for example, the opening angle of the measurement signal passing through the transmission element can be increased, whereby a larger area of the medium is also captured. This design is advantageous when a largest possible measuring region of the medium is to be illuminated.

A further design is characterized in that the transmission element is designed as a lens, wherein the diameter of this lens is essentially identical to the diameter of the attachment lens.

Alternatively or additionally, the attachment lens may also differ from the transmission element in shape, in particular in the radius of curvature, and/or in material.

If a hollow space is present in the interior of the at least one attachment, at least in some areas, it is advantageous if an overpressure protection device is present in the area of the hollow space to limit the overpressure in the attachment. This design is particularly suitable for measurements under high process pressures.

Particularly preferably, the overpressure protection is designed in such a way that it is triggered when a limit value for the pressure in the attachment is exceeded, wherein the limit value is smaller than the maximum permitted process pressure.

According to one design, the limit value is approximately one third of the process pressure.

According to a further design, the overpressure protection is designed as a predetermined breaking point of the attachment housing. Alternatively, the overpressure protection can also be implemented by any other known and suitable overpressure protection.

The presence of an overpressure protection ensures better protection, in particular for the electronics and the wiring of the measuring device.

Particularly preferably, the overpressure protection is arranged on the attachment in such a way that it is not arranged inside the container during operation, i.e. in the mounted state.

According to a further design, the transmission element and/or the attachment lens are formed as a seal. If the transmission element and the attachment lens are formed as a seal, this design ensures the requirements with regard to a double seal for use in explosive applications. The combination of a double seal with an overpressure protection ensures a particularly high level of protection for the electronics and the wiring of the control and evaluation unit.

According to a further design, the attachment lens is designed and adapted to the transmission element in such a way that the attachment lens additionally changes the propagation direction of the measurement signal. Particularly preferably, the transmission element is also designed as a lens according to this design. For example, the attachment lens is designed and adapted to the transmission element in such a way that the attachment lens decreases the opening angle of the measurement signal, for example to about 9°, and pivots the propagation direction by a few degrees, for example by about 6°. The description and/or the determination of the geometrical design of the individual antenna elements, such as the transmission element formed as a lens and/or the attachment lens, is particularly preferably simplified by the assumption that the propagation of the electromagnetic waves is diffraction-free, so that the beam path can be considered instead of the phase fronts. Consequently, a propagating wave can be described particularly simply by rays in the direction of propagation.

This design has the advantage that an inclined mounting position of the antenna for generating and radiating the measurement signal can be compensated, or also that the area to be illuminated in the container of a measuring device can be set particularly flexibly and/or changed, for example, using various attachments.

According to a further particularly preferred design, the fill level measuring device is assigned a plurality of attachments with which different opening angles of the measurement signal and/or different directional changes in the propagation direction of the measurement signal are implemented, in particular with the individual attachments differing in the shape of the attachment lens and/or in the size of the attachment lens and/or in the material of the attachment lens and/or in the distance of the attachment lens from the transmission element in the connected state.

When it is said that a plurality of attachments are associated with a fill level measuring device, it is meant that a plurality of differing attachments are formed in such a way that they can be connected to the process connection element of the level meter. Such connection does not occur simultaneously, rather the individual attachments can be connected to the process connection in different measurement situations.

This system of a fill level measuring device and a plurality of attachments, each of which optimizes the measuring device for different measurement situations, has the advantage that the fill level measuring device can be used particularly flexibly for different applications.

According to a second teaching, the present invention relates to an attachment for connection to a fill level measuring device for producing one of the systems described above. For this, the attachment is designed according to one of the previously described designs.

BRIEF DESCRIPTION OF THE DRAWINGS

There is now a plurality of possibilities for designing and further developing the system according to the invention and the attachment according to the invention. For this, reference is made to the description of the following embodiments together with the drawings.

DETAILED DESCRIPTION

Figure 1:
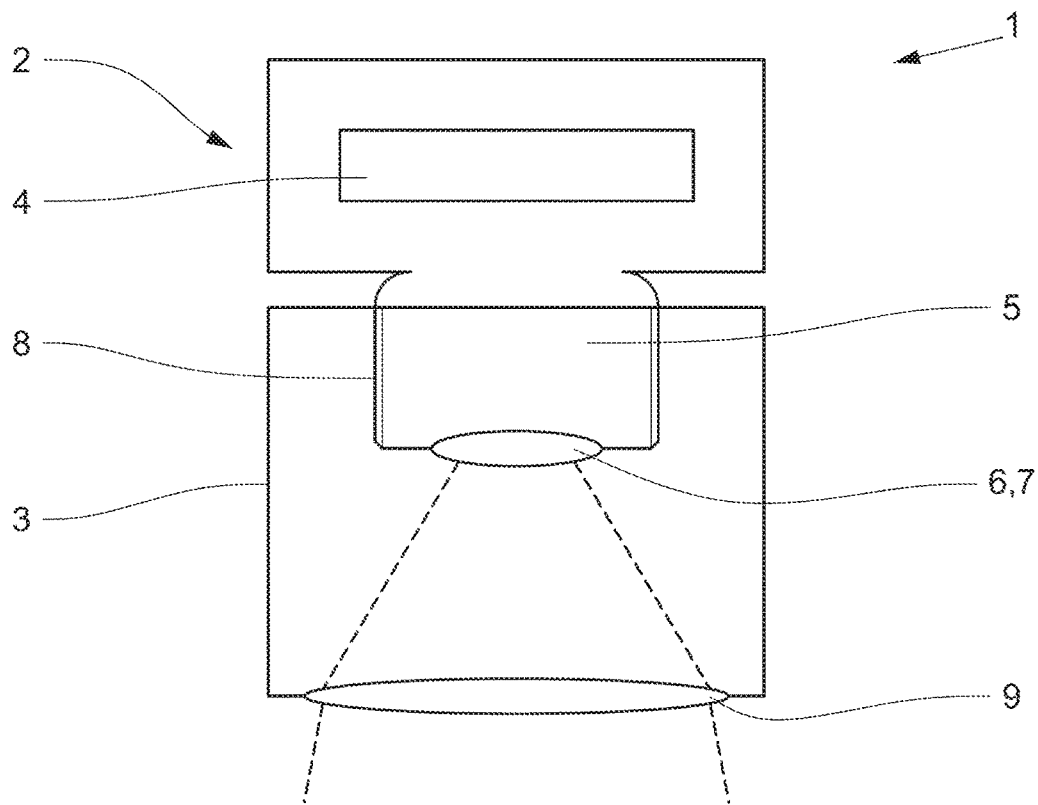
FIG. 1 illustrates a first embodiment of a system according to the invention.

FIG. 1 shows a first embodiment of a system 1 comprising a fill level measuring device 2 for measuring the fill level of a medium in a container and an attachment 3, wherein the fill level measuring device 2 has a control and evaluation unit 4 and a process connection element 5, wherein the process connection element 5 has on the medium side a transmission element 6 in the form of a lens 7, wherein the lens 7 is at least partially permeable to the measurement signal generated by the control and evaluation unit 4.

An attachment 3 is connected to the process connection element 5 via a threaded connection 8, wherein the attachment 3 has an attachment lens 9 on the medium side for coupling the measurement signal into a container 10. In the connected state shown, the attachment lens 9 is designed and arranged in such a way that it shapes, i.e. focuses or expands, the directional characteristic of the measurement signal in the propagation direction of the measurement signal behind the transmission element 6 for adaptation to the process situation.

In the embodiment shown, the attachment lens 9 and the lens 7 are adapted to each other in such a way that the opening angle of the measurement signal is reduced by the attachment lens. For this, the opening of the attachment lens 9 is particularly large. This embodiment is thus particularly advantageous in measuring situations in which the container 10 is long and narrow, or in which interfering installations protrude into the container 10.

Figure 2:
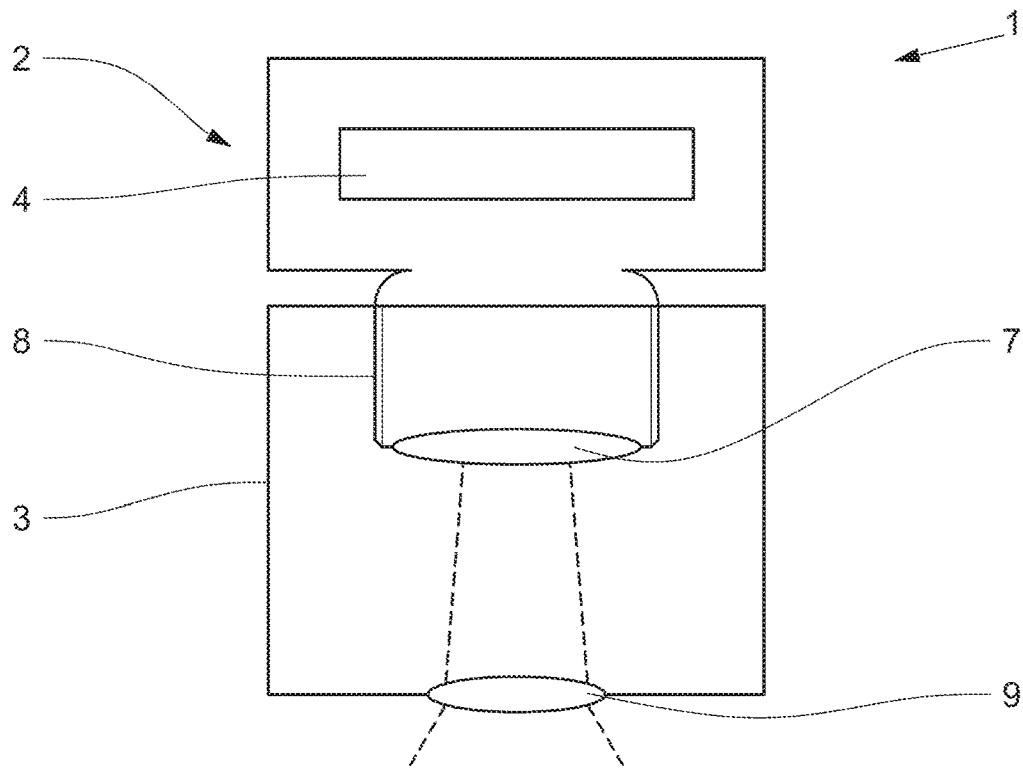
FIG. 2 illustrates a further embodiment of a system according to the invention.

FIG. 2 shows a further embodiment of a system 1 according to the invention, wherein, in contrast to the first embodiment, the lens 7 designed as a transmission element 6 has a larger diameter than the attachment lens 9. According to this design, the lens 7 and the attachment lens 9 are adapted to each other in such a way that the opening angle of the measurement signal is increased by the attachment lens 9. For this, the diameter of the attachment lens 9 is smaller than the diameter of the lens 7.

Figure 3:
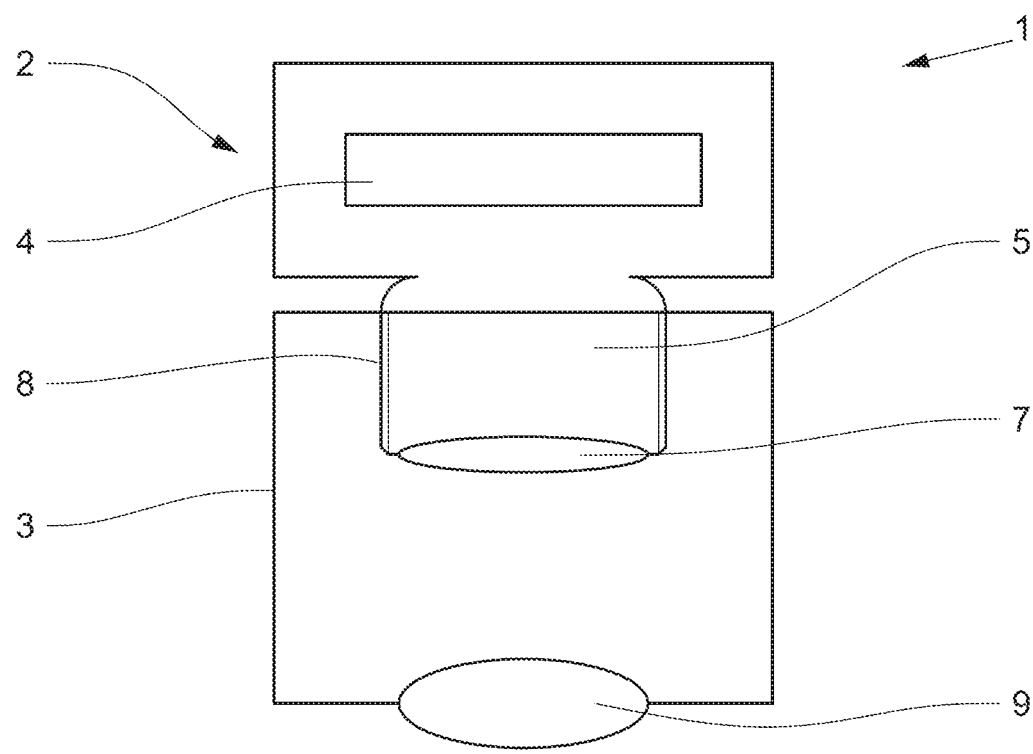
FIG. 3 illustrates a further embodiment of a system according to the invention.

In addition to the deviation in diameter, the attachment lens 9 can also deviate from the lens 7 in shape, in particular in the radius of curvature and/or in material. This is shown in FIG. 3.

Figure 4:
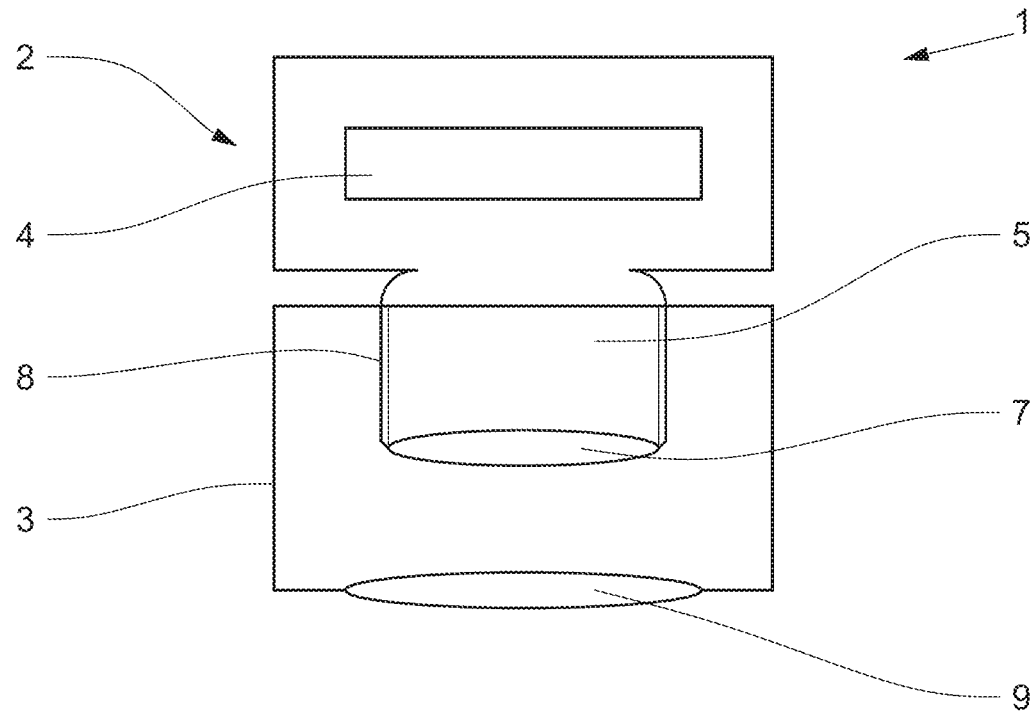
FIG. 4 illustrates a further embodiment of a system according to the invention.

FIG. 4 shows a further embodiment, wherein the distance between the attachment lens 9 and the lens 7 formed as a transmission element 6 is shortened.

Figure 5:
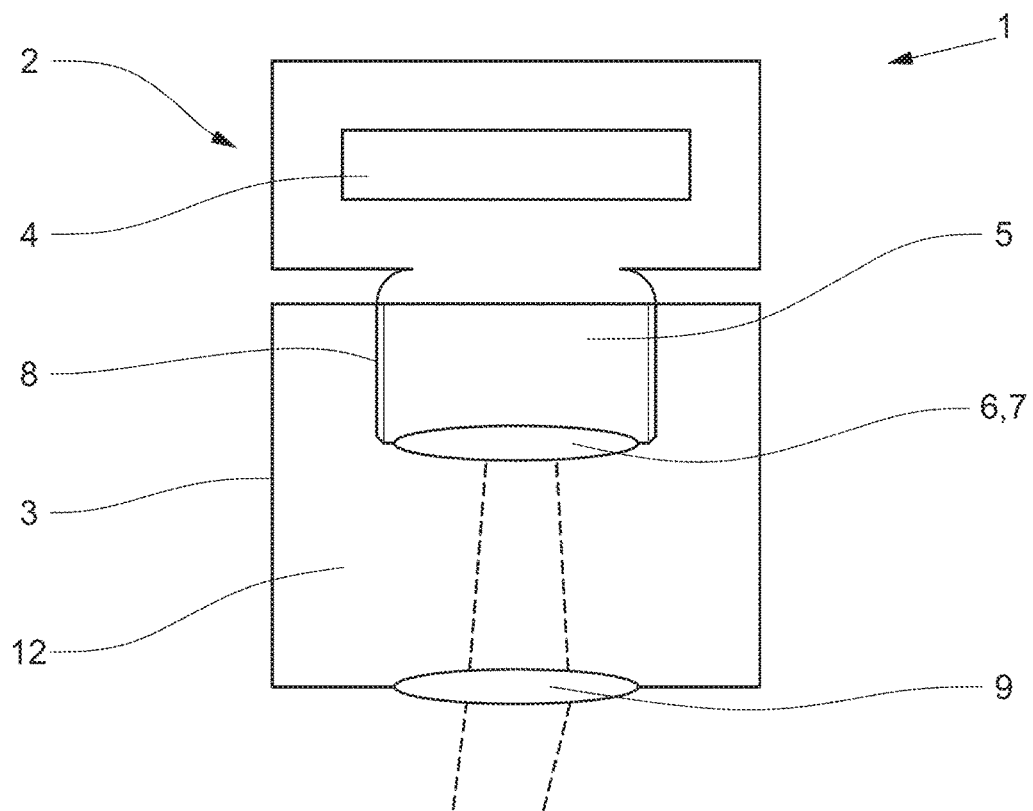
FIG. 5 illustrates a further embodiment of a system according to the invention.

FIG. 5 shows another embodiment of a system 1 consisting of a fill level measuring device 2 and an attachment 3, wherein the transmission element 6 is formed as a lens 7 and wherein the attachment lens 9 is adapted to the lens 7 in such a way that it both decreases and pivots the opening angle of the measurement signal by a few degrees.

Figure 6:
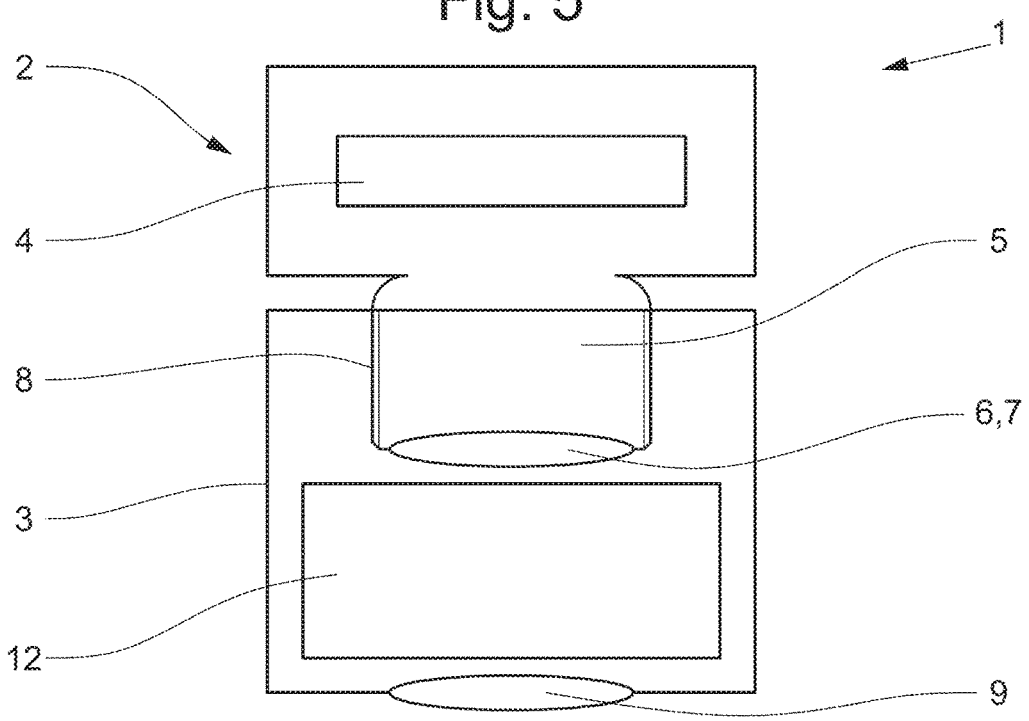
FIG. 6 illustrates a further embodiment of a system according to the invention.

In the embodiment shown in FIG. 6, the diameter of the first lens 7 formed as a transmission element 6 corresponds to the diameter of the attachment lens 9. A dielectric material 12 is arranged between the lenses 7 and 9 for guiding the measurement signal. In this embodiment, both the first lens 7 formed as a transmission element 6 and the attachment lens 9 are formed as a seal, so that here the electronics of the control and evaluation unit 4 and the associated wiring, not shown here, are protected by a double seal.

This embodiment is particularly advantageous in applications where there is a risk of explosion.

Figure 7:
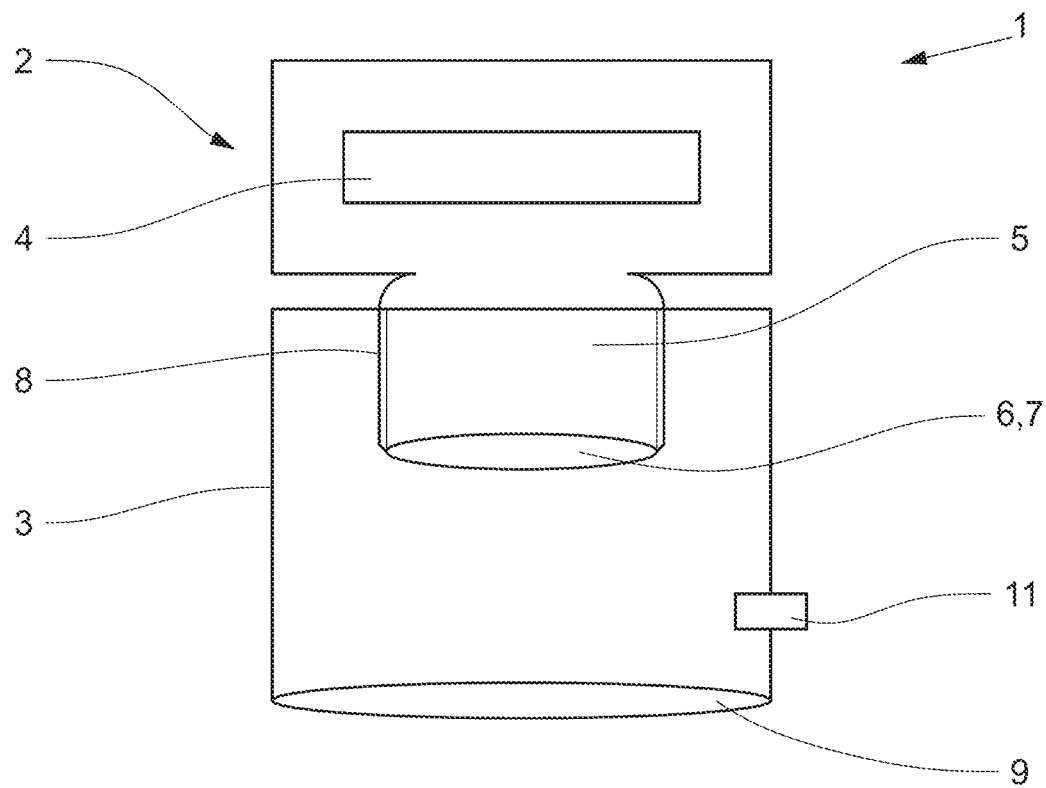
FIG. 7 illustrates a further embodiment of a system according to the invention.

The attachment 3 of the embodiment shown in FIG. 7 additionally has an overpressure safety device 11, which releases pressure from the attachment 3 in the event of an undesired overpressure in the attachment 3, for example if the seal arranged on the process side is defective. Particularly in combination with a double seal, this embodiment is advantageous with regard to the application in explosive measuring situations.

Figure 8:
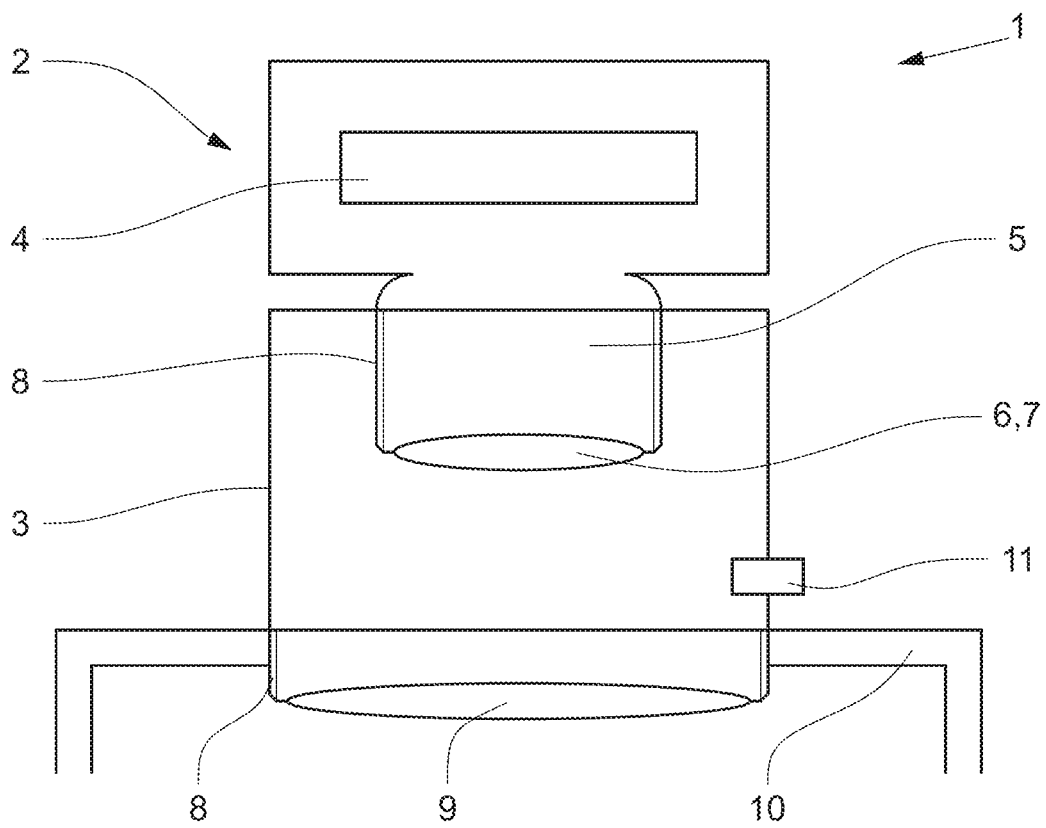
FIG. 8 illustrates a further embodiment of a system according to the invention arranged on a container.

FIG. 8 shows a further embodiment of the system 1 according to the invention, which is arranged on a container 10. In the illustrated embodiment, the attachment 3 is designed as an adapter. The adapter is screwed to both the process connection element 5 and the container connection. Also shown is an overpressure protection 11, which is arranged on the housing of the attachment 3 outside the container 10. As a result, this embodiment is also particularly suitable for use in potentially explosive atmospheres.

The invention claimed is:

1. A system, comprising:
   a fill level measuring device for measuring the fill level of a medium in a container; and at least one attachment;
wherein the fill level measuring device has a control and evaluation unit for generating a measurement signal and a process connection element;
wherein the process connection element has a transmission element on a medium side;
wherein the transmission element is at least partially permeable to the measurement signal;
wherein the at least one attachment is connected to the process connection element;
wherein the at least one attachment has, on the medium side, an attachment lens for coupling the measurement signal into the container;
wherein the attachment lens is designed and, during operation, arranged after the transmission element in the propagation direction of the measurement signal in such a way that the attachment lens changes the opening angle of the measurement signal;
wherein the connection between the process connection element and the at least one attachment is a detachable connection;
wherein the connection is at least one of a non-positive connection and a positive connection; and
wherein the connection is a threaded connection, a latching connection, or a flange connection.

2. The system according to claim 1, wherein the transmission element is designed as a lens or as a window.

3. The system according to claim 1, wherein a holder is provided; and
wherein the at least one attachment is configured to be connected to the container via the holder.

4. The system according to claim 1, wherein the at least one attachment is designed as an adapter; and
wherein the adapter is designed to be connected both to the process connection element and to a container connection via a thread.

5. The system according to claim 1, wherein the at least one attachment has an interior space and the region between the transmission element and the attachment lens is designed as a hollow space.

6. The system according to claim 1, wherein the at least one attachment has an interior space and at least one dielectric material is present in the interior space of the at least one attachment for guiding and/or for adjusting the measurement signal.

7. The system according to claim 1, wherein the at least one attachment has an interior space and a horn structure for guiding the measurement signal is present in the interior space of the at least one attachment.

8. The system according to claim 1, wherein the transmission element is designed as a lens; and
wherein a diameter of the lens is smaller than the diameter of the attachment lens.

9. The system according to claim 1, wherein the transmission element is designed as a lens; and
wherein a diameter of the lens is larger than the diameter of the attachment lens.

10. The system according to claim 1, wherein the transmission element is designed as a lens; and
wherein a diameter of the lens is substantially identical to the diameter of the attachment lens.

11. The system according to claim 5, wherein an overpressure protection is present in the region of the hollow space for limiting the overpressure in the hollow space.

12. The system according to claim 11, wherein the overpressure protection is designed to be triggered when a limit value for the pressure in the at least one attachment is exceeded; and
wherein the limit value is smaller than the maximum permitted process pressure.

13. The system according to claim 1, wherein the transmission element and/or the attachment lens are designed as a seal.

14. The system according to claim 1, wherein the attachment lens is designed and adjusted to the transmission element in such a way that the attachment lens additionally changes the propagation direction of the measurement signal.

15. The system according to claim 1, wherein the fill level measuring device is assigned a plurality of attachments with which different opening angles of the measurement signal and/or different directional changes in the propagation direction of the measurement signal are implemented; and
wherein the individual attachments differ in the shape and/or in the size and/or in the material of the attachment lens and/or in the distance of the attachment lens from the transmission element in the connected state.

16. An attachment for connection to a process connection element of a fill level measuring device for producing a system including the fill level measuring device and the attachment, wherein the fill level measuring device is configured to measure the fill level of a medium in a container, wherein the fill level measuring device has a control and evaluation unit for generating a measurement signal and the process connection element, wherein the process connection element has a transmission element on a medium side, wherein the transmission element is at least partially permeable to the measurement signal, the attachment comprising:
an attachment lens for coupling the measurement signal into the container;
wherein the attachment lens is designed and, during operation, arranged after the transmission element in the propagation direction of the measurement signal in such a way that the attachment lens changes the opening angle of the measurement signal;
wherein the connection between the process connection element and the at least one attachment is a detachable connection;
wherein the connection is at least one of a non-positive connection and a positive connection; and
wherein the connection is a threaded connection, a latching connection, or a flange connection.

* * * * *